Patented Aug. 10, 1943

2,326,569

UNITED STATES PATENT OFFICE 2,326,569

PHENOLIC MOLDING COMPOSITION

Fritz Rosenthal, Knoxville, Tenn., assignor to The University of Tennessee Research Corporation, Knoxville, Tenn., a corporation of Tennessee No Drawing. Application April 19, 1941,
Serial No. 389,465

6 Claims. (Cl. 260—9)

This invention pertains to molding compositions of the type comprising a synthetic resin and a filler which will assume a hard infusible form when subjected to heat and pressure.

Molding compositions comprise broadly a phenolaldehyde condensation product and a filler, other ingredients being present in insignificant percentages. The resin acts as a binder which tends to saturate and unite the particles of the filler in a homogeneous mass under the action of heat and pressure.

The filler is a determining factor of the final characteristics of the molded plastic; mechanical and dielectric strength, water and heat resistance, shrinkage and surface appearance depending upon it. In most cases a filler is chosen which is much cheaper than the resin. In the past, wood flour has been extensively used as a filler. The ideal filler is one that is cheap, readily available in large quantities and which will lend unique and desirable characteristics to the final product.

The absorbing power of any filler is a function of the particle size. The smaller the particles, the greater the surface exposed to the resin, the greater the absorption of resin by the filler and the greater the strength of the compound. Thus, the use of a finer filler will result in a higher resin requirement, increasing up to a particle size of 100–200 mesh where the absorbing power reaches a maximum.

It has previously been suggested in the art to use comminuted cottonseed hulls as a filler for phenolic molding compositions. Hurst Patent No. 1,863,540 suggests such a use. Hurst, however, does not take into consideration the essential elements of particle size, composition of the comminuted hulls, or percentages of the constituents to be used. Various other aspects of this filler are not recognized by Hurst. Since 1930, the year the Hurst patent issued, conceptions of filler requirements have altered radically. Today it is recognized that high absorbency is a primary requisite of any filler. Hurst's basic conception is based on the supposed low absorbing power of cottonseed hulls. He fails to recognize the great adaptability of cottonseed hulls and the fact that by varying particle size and fiber content absorbency can be varied through a wide range.

It has been discovered that cottonseed hulls contain ligno-cellulose of such nature that they do not require preliminary chemical treatment before incorporation in the molding composition. A mechanical disintegration of the hulls is all that is required. This disintegration has been successfully effected in a hammer mill with $\frac{1}{32}''$ screen. An attrition mill or Wyllie mill may also be used successfully.

The comminuted hulls comprise two components, hull bran and alpha cellulose hull fiber. If the hulls have been thoroughly shaved prior to comminution the hull bran content may approximate 100%. Conversely, the hull fiber content may run as high as 25%, when there has been no recovery of lint.

I have determined that the absorbing power of coarse hull bran is exceedingly low and that conversely the absorbing power of comminuted hull fibers is very high, higher in any particle size than that of wood flour. This determination was made experimentally in a series of Gardner-Coleman tests. Ten-gram samples of hull bran and hull fiber were treated drop by drop with vegetable oil until a coherent ball could be formed. The point of formation of the ball was taken as the saturation point. The amount of vegetable oil absorbed indicated the absorbing power of the material.

Experimental batches have been prepared from hull bran alone in particle sizes of from 40 to 200 mesh, without inclusion of fiber, and these batches were found to be inferior in impact strength. However, when a percentage of hull fiber was included an improved impact strength resulted. By varying the percentages of hull bran and hull fiber the properties of the ultimate molded product can definitely be controlled. If the fiber content of a batch of comminuted hulls is low additional comminuted fiber can be added as desired to govern the impact strength of the product.

Various compounds have been prepared in which cottonseed hulls of varying particle size and fiber content were used as fillers, the resin content and method of preparation remaining constant. The resulting compounds were tested for impact strength, modulus of rupture and modulus of elasticity. It was found that the maximum in impact strength is obtained when a cottonseed hull filler comminuted to pass a 100 mesh screen and of 10% fiber content is used. A maximum of modulus of rupture is obtained at 60 mesh screen and 0–5% fiber content. At higher fiber content modulus of rupture decreases, as the hull fibers have no strengthening effect with respect to modulus of rupture. It will therefore be seen that by varying the particle size of the hull filler and the percentage of hull fiber the properties of the molded product can be regulated over a wide range.

A typical example of a molding composition in accordance with the present process is as follows:

150 grams of phenol, 240 grams of a 40% aqueous solution of formaldehyde, 1.5 grams of sodium hydroxide, dissolved in 15 cc. of water are refluxed for 45 minutes in a glycerin bath of 110° C. This resin syrup is mixed in a dough mixer with 300 grams of cottonseed hulls comminuted to 100 mesh and of 10% fiber content, with the addition of 7.5 grams of lime. The mixed compound is dried in a Gordon dryer at 55° C.

The resulting product is of high impact and mechanical strength. By varing the particle size and the percentage of fiber contained, the properties of the composition can be appropriately varied.

It has been determined that for this molding composition the best results are obtained with the use of from 35 to 40% of phenolic resin. The degree of flow of the composition is directly proportional to the resin content and it is possible to reduce this content to a point where the composition will no longer flow and will no longer be suitable for molding.

The cottonseed hull bran and fiber filler has certain other valuable properties. Molding compositions incorporating this filler have a degree of elasticity not found in those compositions formed with the conventional fillers. Further, with most of the conventional compositions it has been necessary to use a lubricant to prevent sticking of the compound in the mold. This problem of sticking is obviated where cottonseed hulls are used as they contain oily constituents which act as a natural lubricant and prevent sticking.

It has been determined that best results are obtained by molding this composition at temperatures of from 280-360° F. under pressures of from 2000-4500 pounds per square inch.

This invention is susceptible of many embodiments without departing from the spirit thereof. The particle size may be varied from 40 to 200 mesh. The phenolic resin may be varied through a wide range. The ratio of comminuted hulls to resin may be widely varied and the properties of the resultant molding composition may thereby be altered. Lastly, the percentage of hull bran to hull fibers may be varied through a range of from 0 to 25% depending upon the mechanical strength, elasticity, modulus of rupture, etc., desired.

The foregoing example is by way of illustration only and is not intended to limit the scope of the invention. Attention is directed to the appended claims for this purpose.

What is claimed is:

1. A molding composition comprising a phenol-formaldehyde resin, a filler for said resin consisting of comminuted cottonseed hull bran and hull fiber, said hull fiber constituting up to 20% of said filler.

2. A molding composition comprising a phenol-formaldehyde resin, a filler for said resin consisting of comminuted cottonseed hull bran and hull fiber of from 40 to 200 mesh, said hull fiber comprising from up to 10% of said filler.

3. A molding composition comprising a phenol-formaldehyde resin, a filler for said resin consisting of cottonseed hull bran and hull fiber comminuted to approximately 100 mesh, said hull fiber comprising approximately 10% of said filler.

4. A molding composition comprising a phenol-formaldehyde resin, a filler for said resin consisting of cottonseed hull bran and hull fiber comminuted to approximately 60 mesh, said hull fiber comprising approximately 5% of said filler.

5. A molding composition comprising a phenol-formaldehyde resin, a filler for said resin consisting of cottonseed hull bran and hull fiber comminuted to approximately 100 mesh, said hull fiber comprising from 5 to 10% of said filler.

6. A molding composition comprising a phenol-formaldehyde resin, a filler for said resin consisting of cottonseed hull bran and hull fiber comminuted to 40 mesh, said hull fiber constituting approximately 5% of said filler and said phenolic resin comprising 35 to 40% of said molding composition.

FRITZ ROSENTHAL.